(No Model.)
N. GIRRENS.
SAW.
No. 288,791. Patented Nov. 20, 1883.
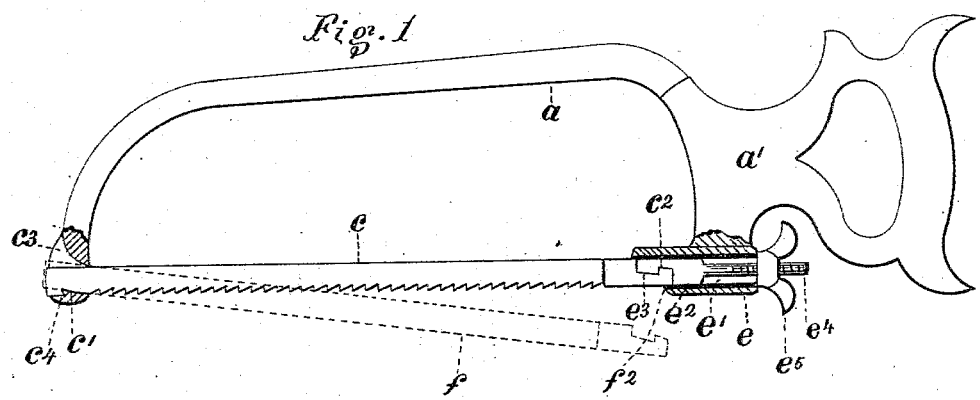
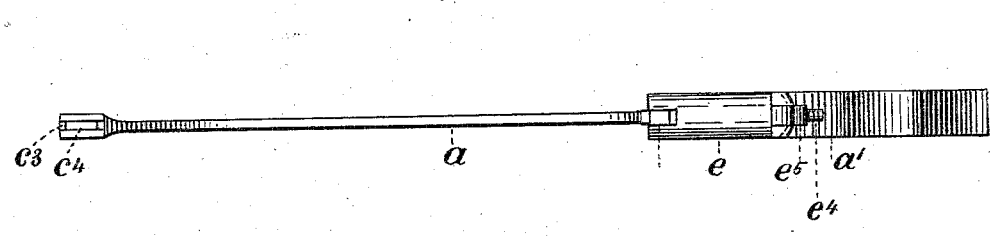
Witnesses
J. M. Caldwell.
James Sangster.
Inventor.
Nicholas Girrens
By James Sangster
Atty.

UNITED STATES PATENT OFFICE.

NICHOLAS GIRRENS, OF BUFFALO, NEW YORK.

SAW.

SPECIFICATION forming part of Letters Patent No. 288,791, dated November 20, 1883.

Application filed August 13, 1883. (No model.)

*To all whom it may concern:*

Be it known that I, NICHOLAS GIRRENS, residing in Buffalo, in the county of Erie and State of New York, have invented certain new and useful Improvements in Saws, of which the following is a specification.

The object of this invention is to provide an easy and reliable means for readily attaching or detaching a saw to or from the saw-frame, so that they may be easily removable for repairing or sharpening the same, as will be fully and clearly hereinafter shown by reference to the accompanying drawings, in which—

Figure 1 represents a side elevation of the device complete, a portion being broken away to show the manner of attaching the saw. Fig. 2 is a view of the under part of the saw-frame.

The saw-frame $a$ is provided with the usual handle, $a'$, attached rigidly to it in the ordinary way. $c$ represents the saw. It is provided with a notch, $c'$, at the outer end, and at the opposite end is a hook or catch, $c^2$. At the front end of the frame is an opening or slot, $c^3$, having a catch, $c^4$, adapted to fit the notch in the saw. The opposite end of the frame is provided with a piece, $e$, having an opening, $e'$, through which passes the screw holding-piece $e^2$, having a catch, $e^3$, corresponding with the catch or hook in the saw. The shank $e^4$ is provided with a screw-thread and a thumb-nut, $e^5$, for tightening the saw when in place.

In putting the saw in place in the frame the notched end is inserted into the opening $c^3$ and the notch $c'$ placed over the catch $c^4$. (See dotted lines $f$ in Fig. 1.) The opposite end of the saw is then moved up in place, so that hooks or catches will engage with each other, as shown. The thumb-nut is then screwed up to tighten the saw in place. The opening in the part $e$ may be either square or made in any well-known way to prevent the holding-piece from turning while operating the thumb-nut. The end of the saw, when drawn up in place, passes into the part $f^2$, or into the opening, and is thereby held securely in place. The manner of removing it will be easily understood from the foregoing description and drawings.

It will be noticed that the shoulder $f^2$ is set back of the upper portion of the piece $e$. The object of this is to allow a quick release of the saw, as it is only necessary to draw its under edge a short distance into the opening and the upper part or edge a corresponding distance into the upper portion in order to secure it, as shown in Fig. 1.

I claim as my invention—

A saw-frame provided with an opening, $c^3$, a catch, $c^4$, and the portion $e$, having an opening, $e'$, the lower part, $f^2$, being back of the upper part, as specified, and provided with the screw-threaded holding-piece $e^2$, having a thumb-nut, $e^5$, in combination with a saw having a hook-shaped catch, $c'$, corresponding in form with the catch $c^4$ in the frame, and having a catch, $c^2$, adapted to fit the catch $e^3$ in the screw-threaded holding-piece, whereby the saw may be readily connected or detached, substantially as described.

NICHOLAS GIRRENS.

Witnesses:
J. M. CALDWELL,
JAMES SANGSTER.